United States Patent [19]

Goldenfeld

[11] Patent Number: 4,637,274

[45] Date of Patent: Jan. 20, 1987

[54] AUXILIARY DRIVE FOR PEDAL-DRIVEN ROAD VEHICLES

[75] Inventor: Iliya Goldenfeld, Jerusalem, Israel

[73] Assignee: Kibbutz Gordonia Hulda, Mobile Post Ayalon, Israel

[21] Appl. No.: 710,083

[22] Filed: Mar. 11, 1985

[30] Foreign Application Priority Data

Mar. 14, 1984 [IL] Israel ......................... 71233

[51] Int. Cl.$^4$ ...................... B60K 1/00; B62M 23/02; B62K 11/00
[52] U.S. Cl. .................................... 74/625; 180/65.2; 180/205
[58] Field of Search ................ 74/625; 180/65.2, 65.3, 180/65.6, 205, 206, 207, 220; 318/759; 320/14, 61

[56] References Cited

U.S. PATENT DOCUMENTS

| | | | |
|---|---|---|---|
| 3,431,994 | 3/1969 | Wood | 180/65.6 |
| 3,921,741 | 11/1975 | Garfinkle et al. | 180/65.2 |
| 3,921,745 | 11/1975 | McCulloch et al. | 180/65.2 |
| 4,030,562 | 6/1977 | Leighton et al. | 180/65.2 |
| 4,095,663 | 6/1978 | Gaffney | 180/65.3 |
| 4,095,665 | 6/1978 | Armfield | 180/65.3 |
| 4,111,274 | 9/1978 | King et al. | 180/65.6 |
| 4,221,275 | 9/1978 | Pennebaker et al. | 180/220 |
| 4,280,581 | 7/1981 | Rudwick | 180/220 |
| 4,313,517 | 2/1982 | Pivar | 180/65.2 |

FOREIGN PATENT DOCUMENTS

| | | | |
|---|---|---|---|
| 870657 | 3/1942 | France | 180/206 |
| 593822 | 12/1977 | Switzerland | 180/207 |

Primary Examiner—Lawrence Staab

[57] ABSTRACT

An electric auxiliary drive for a pedal-driven road vehicle is provided. The drive comprises an electric motor, a rechargeable multicell battery to power the motor and switch means to control the motor. The motor is adapted to operate in a first mode in which it functions as a mover, drawing energy from the battery and imparting it to the vehicle, and in a second mode in which it functions as a generator, drawing energy from the vehicle and imparting it to said battery. There is further provided a first transmission means to provide a permanent kinematic connection between the motor and the pedal axle of the vehicle for the moving thereof when operating in the first mode and a second transmission means to selectively provide a kinematic connection between one wheel of the vehicle and the motor, to enable the motor to operate in the second mode.

6 Claims, 7 Drawing Figures

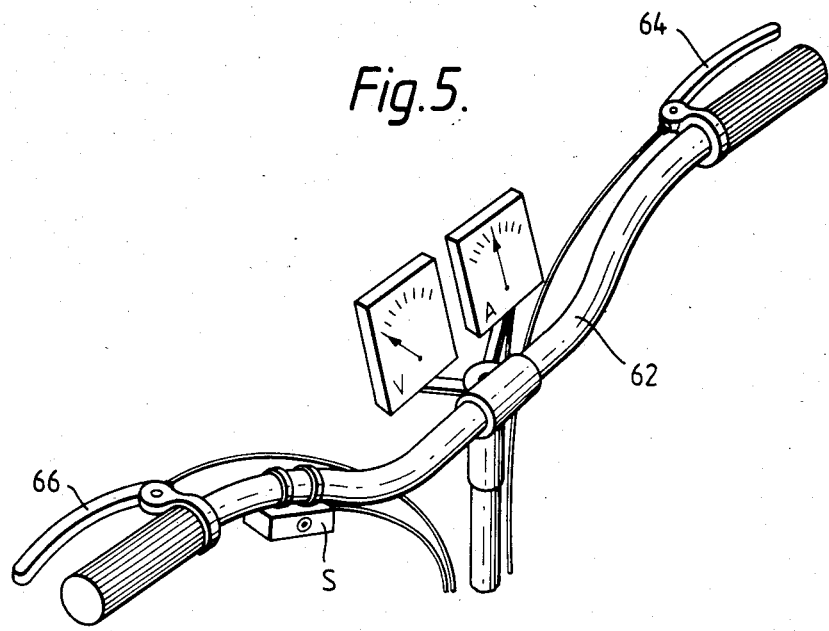
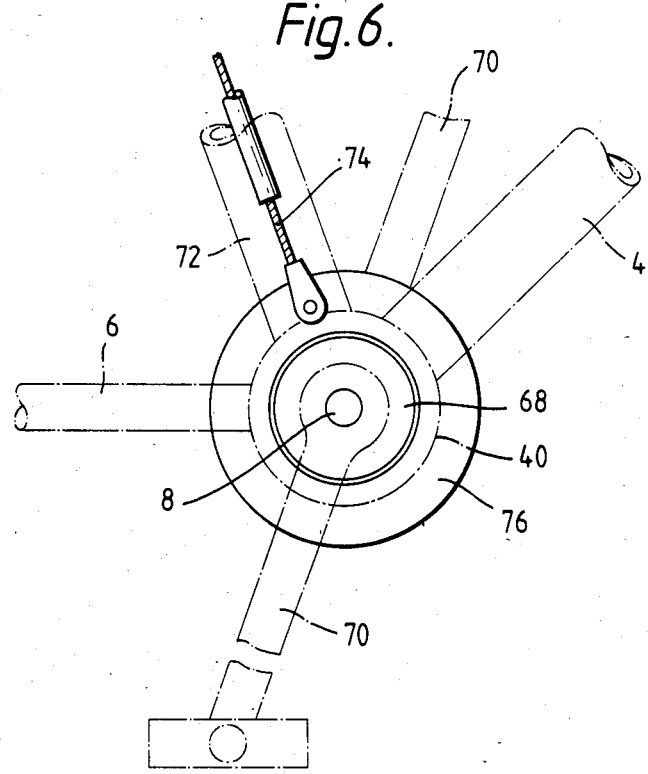

AUXILIARY DRIVE FOR PEDAL-DRIVEN ROAD VEHICLES

The present invention relates to an electric auxiliary drive for pedal-driven road vehicles, in particular for bicycles.

Given the grim prospects of our energy situation, the idea of the bicycle as a possible alternative, at least for short-distance travel, to the private car seems less far-fetched today as it might have been a decade ago. A precondition for the wider application of the bicycle for purpose of transport (as distinct from recreation or sport) is, however, the provision of auxiliary power to help overcome the limitations of the human body.

Electric-motor-assisted bicycles are known. A recent example is a bicycle marketed by an American firm (General Engines Co.) under the name of "Pedalpower". This bicycle is provided with an electric motor mounted on the head tube of the frame in such a way that, by manually tilting it in the forward direction, its output pulley is brought into a position in which it makes contact with the front-wheel tire of the bicycle, which is thus driven by friction. The motor is powered by a conventional lead-acid battery mounted on the luggage carrier.

This prior-art drive, however, suffers from several serious disadvantages: the friction drive is rough on the tire, causing premature wear. Furthermore, it is impossible to use the standard, high-pressure tires, which will not offer a sufficiently large contact surface to provide proper "bite" for the friction pulley. The low-pressure, semi-balloon tires required are not only more expensive, but also offer greater rolling resistance. A drawback even more serious is the large and bulky battery required to provide, according to the manufacturers, about 36 km of travel between rechargings. As no attempt is made, by this prior-art device, to recover at least some of the kinetic energy of the bicycle plus rider during braking episodes, and as the power required to move a load of 100 kg (=rider+bicycle) along a mean gradient of 2.5° at a mean velocity of 8 km/h is about 100 W, 36/8=4.5 h of travel would require an energy of $100 \times 4.5 = 450$ Wh which, given a specific lead-acid battery weight of about 35 g/Wh, would indicate a battery weight of about 15.5 kg.

Another motor-assisted bicycle is disclosed in DE No. 3003026. As in the "Pedalpower" prior art, power is transmitted to the bicycle tire by friction, yet far less efficiently and at even greater cost to the tire, as is clear from FIG. 3 which, if it were drawn properly and to larger scale, would show that, due to the effect of the spring 17, the contact between the drive wheel 8 and the tire 18 is not a point or line contact, but an area contact which, due to the large differences in surface speed across the conical wheel sections involved in this contact, must always cause slip and, therefore, wear. The is particularly so because in order to transmit a torque sufficiently large with a relatively small effective diameter of the friction wheel, and a rather limited contact pressure, the surface of the wheel must of necessity be very rough, to provide a large coefficient of friction.

In contradistinction to the "Pedalpower" prior art, the above-discussed prior art recognizes the importance of regenerative braking, as well as the fact that, for efficient energy recovery during braking episodes, the motor-generator must rotate at much higher speed than during drive episodes. This is one of the reasons for the tapered shape of the friction wheel 8. However, when applied as shown in FIG. 5 in order to obtain the highest possible speed for the motor functioning as generator, the effectiveness of the friction transmission is still lower due to the now reduced diameter of the friction wheel, and friction damage still higher, the more so as the friction effort is now mostly carried by the tire wall rather than the tire tread. As during braking slip is not only unavoidable but even desirable, this aspect is even more serious, since the tire wall is not at all designed for wear.

It is one of the objects of the present invention to overcome these disadvantages and drawbacks of the prior-art devices and to provide an auxiliary drive that transmits power directly to the pedal axle that uses regenerative braking, i.e., recovers, during downhill-travel braking, a high percentage of the electrical energy invested in the uphill stretch, using a relatively large friction wheel that will cause no appreciable tire wear applied, as it is, against the tire tread rather than against the tirewall, and manages with a power source weighing up to one order of magnitude less than the batteries of the above-prior-art devices.

This the present invention achieves by providing an electric auxiliary drive for a pedal-driven road vehicle comprising: an electric motor; a rechargeable multicell battery to power said motor; switch means to control said motor, which motor is adapted to operate in a first mode in which it functions as a mover, drawing energy from said battery and imparting it to said vehicle, and in a second mode in which it functions as a generator, drawing energy from said vehicle and imparting it to said battery; first transmission means to provide a permanent kinematic connection between said motor and the pedal axle of said vehicle for the moving thereof when operating in said first mode; second transmission means to selectively provide a kinematic connection between one wheel of said vehicle and said motor, to enable said motor to operate in said second mode, wherein at least said first transmission means are substantially positive transmission means.

The greatly reduced bulk of the battery facilitates the use of the auxiliary drive according to the invention also for the 20"-wheel, collapsible bicycles increasingly used today by commuters traveling to town in cars, leaving their cars in car parks provided at the outskirts, and getting to the town center on bicycles carried, in the collapsed state, in the boot of their car.

Used as implied by its designation, i.e., as an auxiliary to, rather than a substitute for, muscle power, the drive will make power-assisted travel on hilly terrain equivalent to non-assisted travel on flat terrain. If uphill stretches are negotiated with an effort roughly equally shared by muscle and electric power, regenerative braking on the downhill stretch, that is, turning the electric motor into an electric generator will, by recharging the battery, about recoup the electric energy expended on the uphill section.

Other features and advantages will be apparent from the following detailed description.

The invention will now be described in connection with certain preferred embodiments in the following examples so that it may be more fully understood. It is not, however, intended to limit the invention to these particular embodiments. On the contrary, it is intended that all alternatives, modifications and equivalents as may be included within the scope of the invention as defined by the appended claims be included herein. Thus, the following examples which include preferred embodiments will serve only to illustrate the practice of this invention, it being understood that the particular formulations described are by way of example and for purposes of illustrative discussion of preferred embodiments of the present invention only and are presented in the cause of providing what is believed to be the most useful and readily understood description of formulation procedures as well as of the principles and conceptual aspects of the invention.

In the drawings:

FIG. 5 is an enlarged perspective view of the handlebar of the bicycle of FIG. 1;

FIG. 6 shows the location of the freewheeling clutch which pulls the Bowden cable for regenerative braking.

Figure 1:
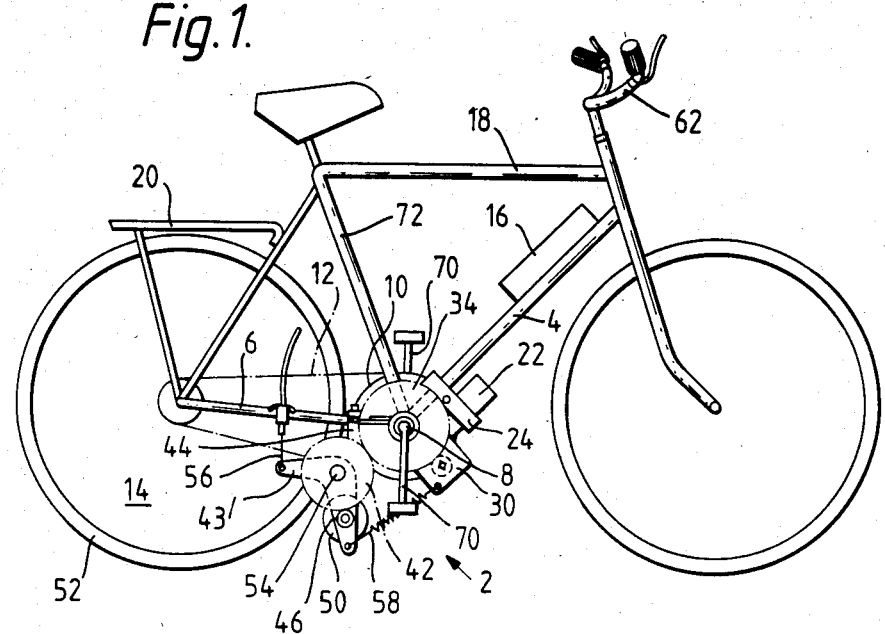
FIG. 1 is a general view of a bicycle fitted with the auxiliary drive according to the invention.

Referring now to the drawings, there is seen in FIG. 1 a bicycle equipped with the auxiliary electric drive according to the invention. The drive 2 itself, explained in detail further below, is supported by various members of the bicycle frame, in this particular case by the down tube 4 and the chain stays 6, and transmits power directly to the pedal axle 8 (and thence, via the standard chain wheel 10 and the chain 12 to the rear wheel 14). The battery 16 is advantageously mounted on the down tube 4 or suspended from the cross bar 18, but could be accommodated whenever convenient, for instance on the luggage carrier 20 or in a pannier suspended from the latter.

In bicycles with back-pedal or coaster brake the drive controls (to be discussed in greater detail further below) are all located on the bicycle handlebar, while in bicycles with a simple free-wheeling rear hub, in which the handlebar must carry two hand brakes, the mechanism for regenerative braking is actuated by a device, to be explained further below, attached to the pedal axle.

The mechanical aspects of the drive according to the invention are illustrated in detail in FIGS. 2 to 6.

There is seen an electric permanent-magnet d.c. motor 22 of the type that, when mechanically driven, functions as generator, producing electrical energy. By means of a bracket 24, the motor is rigidly attached to the down tube 4. At 24 V, this motor has a rated speed of 1700 rpm and an output of about 400 w. The relatively high output speed of 1700 rpm is reduced in two stages (see FIG. 2, in which the device is shown in the drive mode, in which the motor 22 assists the rider), to obtain a chain-wheel speed of about 30 rpm. According to the ratio: chain wheel/rear hub sprocket, this results in a bicycle-wheel speed of about 75–90 rpm. The first of these stages is a worm gear comprising a worm 26 keyed to the shaft of the motor 22, and a worm wheel 28 which meshes with the worm 26, the transmission ratio being 1:5.6. The pitch angle of both the worm and the worm wheel is 45°, which makes this worm drive reversible, i.e., not only can the worm 26 drive the worm wheel 28, but the latter can also drive the former. Both components are accommodated in a casing 30 attached to the motor 22. The second gearing-down stage comprises a gear pinion 32 keyed to, or integral with, the shaft of the worm wheel 28, and a gear wheel 34 meshing with the pinion 32, at a transmission ratio of 1:10, overall reduction being so far $1/5.6 \times 1/10 = 1/56$, that is, the gear wheel 34 rotates at $1700/56 \approx 30$ rpm. The gear wheel 34 is mounted on the outer member or rim 36 of a freewheeling clutch whose inner member or hub 38 is keyed to the pedal axle 8, to which, on the other side of the bottom bracket bearing 40 (see FIG. 6) is also keyed the chain wheel 10. In unassisted travel, i.e., when the bicycle is pedal-powered only, the clutch hub 38 overruns, leaving the gear wheel stationary. In the braking mode of motor operation, in which the motor 22 functions as generator, and which will be explained in greater detail further below, the clutch rim 36, rotating together with the gear wheel 34 (but in a sense opposite to the sense of rotation in the drive mode), overruns, leaving the clutch hub 38, pedal axle 8 and chain wheel 10 stationary. The sense of rotation, in the drive mode, of all components is indicated by arrows.

Figure 4:
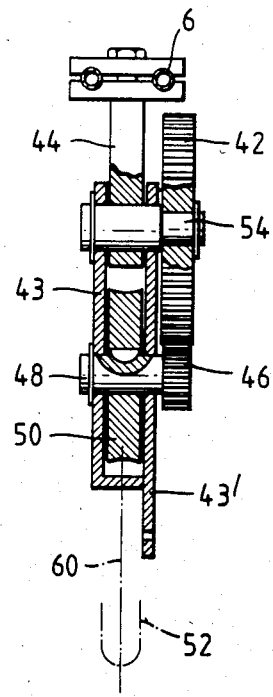
FIG. 4 is a view in cross section, along plane IV—IV, of FIG. 2.
Figure 2:
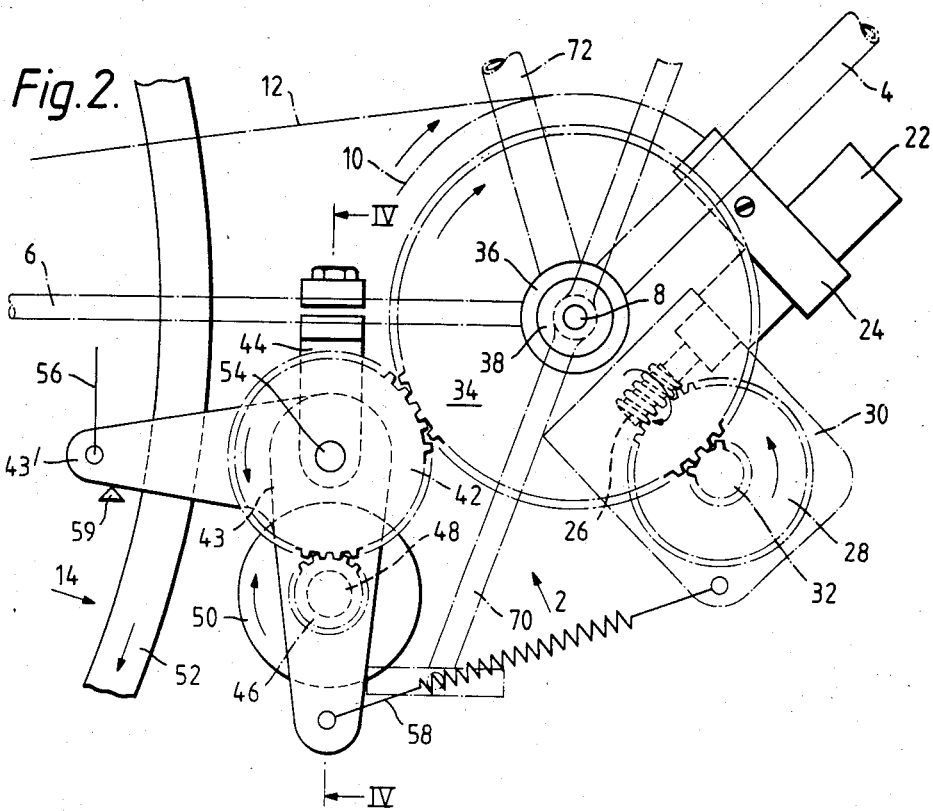
FIG. 2 is a schematic representation of the device as shown in the drive mode.

Further seen in FIG. 2 is an idler gear 42 mounted on a frame 43 hund from a bracket 44 clamped to the chain stays 6 and in permanent mesh with the gear wheel 34 on the one hand, and with a gear pinion 46, on the other. Keyed to the shaft 48 of the latter is a friction wheel 50 which, in the braking mode, as will be explained further below, can be applied against, and is then driven by, the bicycle tire 52. Due to the permanent mesh: gear 34/idler 42, the latter, as well as the pinion 46 and friction wheel 50 will revolve also in the drive mode (FIG. 2), although to no practical purpose. A cross-sectional view of the frame 43 and the components mounted thereon is shown in FIG. 4 in which, for sake of clarity, all friction-reducing components, such as bearing sleeves or bushings have been left out. The frame 43, 43' can swivel about the shaft 54 of the idler gear 42, and its front member 43' has the shape of a bellcrank lever (see FIGS. 2, 3), to one end of which is attached the end of a Bowden cable 56, and to the other end, the end of a tension spring 58 whose second end is fixedly attached to the gear casing 30. It is seen that the profile of the friction wheel 50 is slightly concave to provide a better grip on the tire 52 and to reduce tire wear. It is also clear from FIG. 4 that the position of the friction wheel 50 with respect to the central plane 60 of the tire is symmetrical, the frictional effort thus being applied to the tire tread only.

Figure 3:
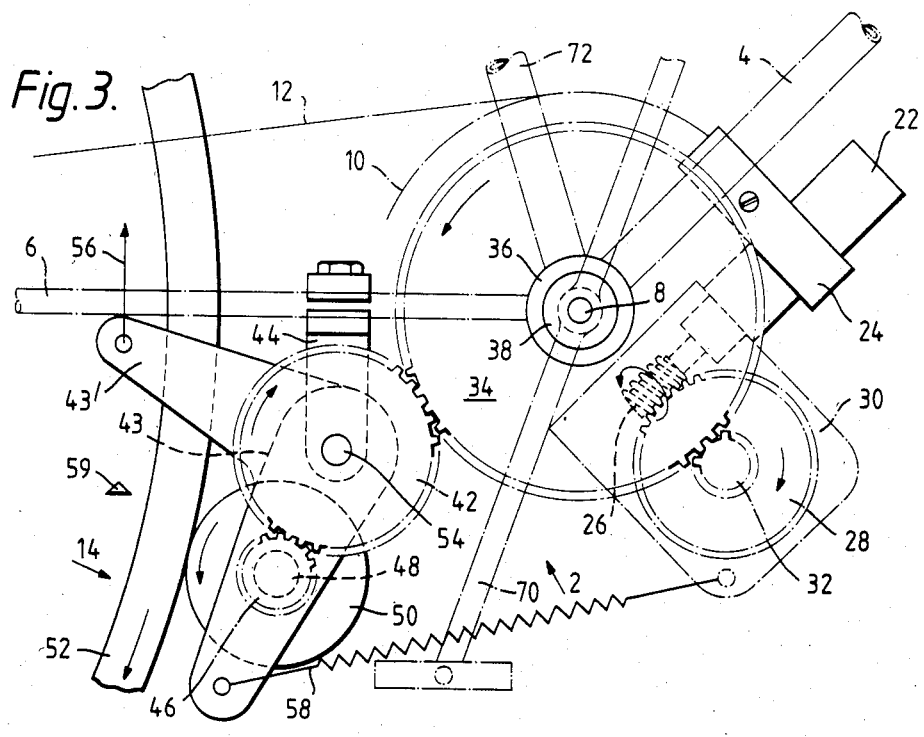
FIG. 3 is a schematic representation of the device as shown in the braking mode.

FIG. 3 shows the device in the braking mode, in which, by pulling the Bowden cable 56 (by means to be explained further below, and against the restoring force of the spring 58), in direction of the arrow, the frame 43, 43' has been swiveled from a rest position defined by a stop 59 towards the tire 52, while the friction wheel 50 is pressed against, and driven by, the tire 52.

The principle of regenerative braking has already been briefly touched upon, as has the fact that, for efficient regeneration, i.e., for using the motor working as generator, to recover a maximum amount of the kinetic energy of the bicycle rider as electric energy for the recharging of the batteries, the speed of the motor working as generator must be considerably larger than when working in the drive mode. In the auxiliary drive according to the invention this is indeed the case. Being now driven by the rear-wheel tire 52, the motor/generator 22 is geared up in two stages, the first stage being the tire/friction-wheel engagement. At a diameter ratio of about 1 (friction wheel 50) to 7 (tire 52), the pinion 46 will be geared up at a ratio of 7:1. Adding now the next gearing-up stages, in which the pinion 46 drives the pinion 32 (transmission ratio 1.7:1), and the wormwheel 28 drives the worm 26 keyed to the motor shaft (transmission ratio 5.6:1), overall gearing up will be: $7/1 \times 1.7/1 \times 5.6/1 \approx 67/1$. Remembering that, up to the chain wheel 10, reduction in the drive mode was 1/56 and, assuming a chain-wheel/rear hub sprocket transmission ratio of 2.5:1, total gearing-down in the drive mode was $1/56 \times 2.5/1 \approx 1/22$, it is seen that, the gearing-up ratio being 67/1, the motor/generator, operating in the braking mode is rotated about three times as fast per revolution of the bicycle wheel as it rotates in the drive mode.

Figure 7:
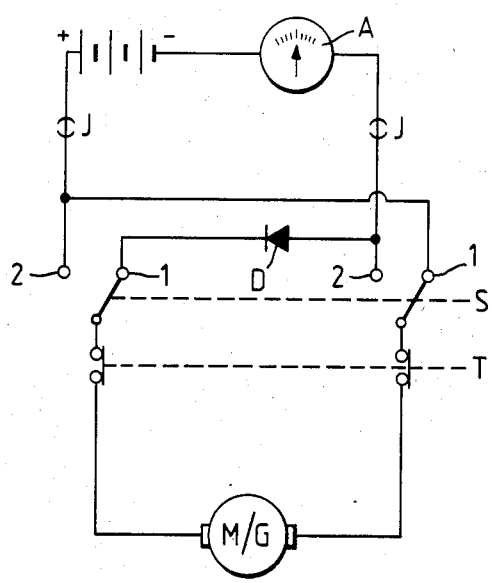
FIG. 7 represents the electrical circuit of the auxiliary drive according to the invention.

As has already been mentioned, in bicycles with back-pedal or coaster brake, regenerative braking is controlled from the handlebar 62, a perspective view of which is shown in FIG. 5. The second end of the Bowden cable 56 (FIGS. 2, 3) is here attached to a standard brake handle 64. Also seen on the handlebar is a second handle 66 for the obligatory hand brake, a push button switch 5, and two meters V and A, to be explained in conjunction with the electric circuit diagram of FIG. 7.

In bicycles with a simple freewheeling rear hub in which according to law the handlebar must carry two hand brakes (one for the front, the other for the rear wheel), a small overrun clutch 68 is attached to that portion of the pedal axle 8 that protrudes from the chain-wheel side of the bottom bracket bearing 40 (FIG. 6, also showing the pedal cranks 70 and the seat tube 72), on the other side of which bearing are located the freewheeling clutch 36/38 and the gear wheel 34. During forward pedaling, the clutch 68 freewheels, but during backpedaling the cable end 74, pivotable attached to the rim 76 of the overrun clutch 68 is pulled downwards by the counterclockwise rotation of the rim 76 produced by backpedaling, thus initiating the above-described swiveling motion that produces the braking action.

A further advantage of regenerative braking is the fact that the generator reaction which produces the braking force is proportional to bicycle velocity. That means that in downhill travel an equilibrium is soon established between bicycle acceleration and the braking force, and speed becomes constant. For final braking to a stillstand one can of course apply the mechanical brakes.

Rechargeable NiCd batteries or dry lead-acid batteries have been found suitable as the power source of the auxiliary drive, with the total battery weight required being a function of the rider's ability (and willingness) to "pull his weight". Experience has shown that provided the uphill stretches are not longer than 1 km and not steeper than 6° (which is very steep indeed), and that these uphill stretches are followed by corresponding downhill stretches, a healthy middle-aged person needs up to 3 kg of these NiCd batteries, while young, vigorous people should be able to do with less than 1 kg.

FIG. 6 is a schematic circuit diagram of the drive according to the invention. Underlying the simplicity of this circuit is the fact that, during regenerative braking, the motor/generator rotates in the opposite sense than during power-assisted travel, due to the interposition of the friction wheel 50. This permits the connection between battery and motor/generator via a diode D, to the effect that, in the normal position, 1, of the switch S, no current can pass. When now regenerative braking is applied, the voltage generated by the motor/generator is of such polarity that the diode is no longer blocking, provided this voltage is higher than the battery voltage. This, however, is always the case, due to the above-discussed gearing-up during regenerative braking, which is higher than the gearing-down during assisted travel. T is a thermorelay protecting the motor/generator against overheating and, at the same time, serving also as general on-off switch. J represents jacks for charging from an a.c. source. To this end, the bicycle could be provided with a suitable step-down transformer, permitting the battery to be charged directly from any convenient mains outlet. For assisted travel, the switch S is shifted to position 2. To prevent battery waste, this switch, located on the handlebar, is advantageously designed as a pushbutton which must be pressed down as long as assistance is required. When released, the switch S will automatically return to position 1. The amperemeter A (see also FIG. 5) is preferably mounted on the handlebar, serving as a visual feedback for the rider who, it has been found, is rapidly learning how to optimize his driving behavior by watching the pointer.

Optionals includable in the circuit are front and rear lights, a direction indicator, overvoltage supply (up to 36 V) for short-time peak power, a state-of-battery indicator (see voltmeter in FIG. 5), etc.

While the transmission ratios given in the preceding description were found to be particularly favorable, it is obvious that other ratios could also be used.

It will be evident to those skilled in the art that the invention is not limited to the details of the foregoing illustrative embodiments and that the present invention may be embodied in other specific forms without departing from the spirit or essential attributes thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed is:

1. An electric auxiliary drive for a pedal-driven road vehicle comprising:
    an electric motor;
    a rechargeable multicell battery to power said motor;
    switch means to control said motor, which motor is adapted to operate in a first mode in which it functions as a mover, drawing energy from said battery and imparting it to said vehicle, and in a second mode in which it functions as a generator, drawing energy from said vehicle and imparting it to said battery;
    first transmission means to provide a kinematic connection between said motor and the pedal axle of said vehicle for the moving thereof when operating in said first mode;
    second transmission means to selectively provide a kinematic connection between one wheel of said vehicle and said motor, to enable said motor to operate in said second mode, wherein at least said first transmission means are positive transmission means, and wherein, when operating in said second mode as generator, said motor is adapted to rotate at a speed substantially higher per revolution of said vehicle wheel, than when operating in said first mode as mover.

2. The device as claimed in claim 1, wherein at one and the same rotational speed of said vehicle wheel, said motor is rotated at a substantially higher speed in said second mode of rotation when it rotates in said first mode.

3. The device as claimed in claim 1, wherein said first transmission means comprises a worm keyed to the shift of said motor, a worm wheel meshing with said worm, gear pinion keyed to the shaft of said worm wheel, and a gear wheel meshing with said pinion and mounted on the outer member of a freewheeling clutch, the inner member of which is keyed to said pedal axle.

4. The drive as claimed in claim 1, wherein at least one member of said second transmission means is a friction wheel adapted to be brought into frictional contact with the tire of said vehicle wheel.

5. The drive as claimed in claim 4, wherein said second transmission means comprises an idler gear in permanent mesh with a gear wheel of said first transmission means, a gear pinion in permanent mesh with said idler gear and mounted on a frame adapted to swivel about the axis of said idler gear, and said friction wheel, mounted on, and keyed to, the shaft of said pinion, and wherein frictional contact of said friction wheel with said tire is effected by swiveling said frame about said axis against the restoring force of spring means.

6. The drive as claimed in claim 1, further comprising cable means to effect shifting from said first to said second mode of operation.

* * * * *